(12) United States Patent
Arrasvuori

(10) Patent No.: US 8,452,784 B2
(45) Date of Patent: May 28, 2013

(54) METHOD AND APPARATUS FOR SEARCHING GEO-TAGGED INFORMATION

(75) Inventor: Juha Henrik Arrasvuori, Tampere (FI)

(73) Assignee: Nokia Corporation, Espoo (FI)

( * ) Notice: Subject to any disclaimer, the term of this patent is extended or adjusted under 35 U.S.C. 154(b) by 306 days.

(21) Appl. No.: 12/604,154

(22) Filed: Oct. 22, 2009

(65) Prior Publication Data

US 2011/0099180 A1    Apr. 28, 2011

(51) Int. Cl.
*G06F 17/30*    (2006.01)
(52) U.S. Cl.
USPC ........... 707/754; 707/764; 707/918; 707/919; 707/920
(58) Field of Classification Search
USPC ............... 707/705, 706, 709, 712, 724, 726, 707/729, 754, 764, 918, 919, 920
See application file for complete search history.

(56) References Cited

U.S. PATENT DOCUMENTS

| | | | | |
|---|---|---|---|---|
| 6,317,718 | B1* | 11/2001 | Fano | 705/14.39 |
| 6,424,910 | B1* | 7/2002 | Ohler et al. | 701/202 |
| 6,829,532 | B2* | 12/2004 | Obradovich et al. | 701/207 |
| 7,013,151 | B2* | 3/2006 | Hirokawa | 455/456.1 |
| 7,231,405 | B2* | 6/2007 | Xia | 1/1 |
| 7,418,341 | B2 | 8/2008 | Wuersch et al. | |
| 7,469,247 | B2 | 12/2008 | Cossins et al. | |
| 7,917,866 | B1* | 3/2011 | Karam | 715/810 |
| 8,290,942 | B2* | 10/2012 | Jones et al. | 707/723 |
| 2002/0055924 | A1* | 5/2002 | Liming | 707/100 |
| 2002/0103892 | A1* | 8/2002 | Rieger, III | 709/223 |
| 2002/0143462 | A1* | 10/2002 | Warren | 701/200 |
| 2003/0061211 | A1* | 3/2003 | Shultz et al. | 707/3 |
| 2003/0220734 | A1 | 11/2003 | Harrison | |
| 2005/0288836 | A1* | 12/2005 | Glass et al. | 701/29 |
| 2006/0197763 | A1* | 9/2006 | Harrison et al. | 345/441 |
| 2007/0112729 | A1* | 5/2007 | Wiseman et al. | 707/3 |
| 2007/0118430 | A1* | 5/2007 | Wiseman et al. | 705/26 |
| 2008/0183382 | A1 | 7/2008 | Asai et al. | |
| 2008/0228719 | A1* | 9/2008 | Abhyanker et al. | 707/3 |
| 2009/0028440 | A1* | 1/2009 | Elangovan et al. | 382/216 |
| 2009/0063451 | A1 | 3/2009 | Bennett | |
| 2009/0198767 | A1 | 8/2009 | Jakobson et al. | |

(Continued)

FOREIGN PATENT DOCUMENTS

| | | |
|---|---|---|
| EP | 1 072 987 A1 | 1/2001 |
| JP | 8189838 | 7/1996 |
| WO | WO 2007/067760 A2 | 6/2007 |
| WO | WO 2009/126231 A1 | 10/2009 |

OTHER PUBLICATIONS

International search report and written opinion for corresponding international application No. PCT/FI2010/050721 dated Jan. 19, 2011, pp. 1-14.

(Continued)

*Primary Examiner* — Thanh-Ha Dang
(74) *Attorney, Agent, or Firm* — Ditthavong Mori & Steiner

(57) ABSTRACT

An approach is provided for presenting search information based on search parameters including a specified search region. Input parameters graphically specifying a search region on an image of a map are received. The input parameters include a height parameter and the search region corresponds to one or more search criteria. A search based on the criteria is caused, at least in part, according to the specified search region to output a search result. Presentation of the search result is caused, at least in part, within the search region.

14 Claims, 12 Drawing Sheets

U.S. PATENT DOCUMENTS

| | | | |
|---|---|---|---|
| 2009/0210416 A1* | 8/2009 | Bennett | 707/5 |
| 2009/0271718 A1* | 10/2009 | Balaishis et al. | 715/760 |
| 2010/0036834 A1* | 2/2010 | Bandas | 707/5 |
| 2010/0169011 A1* | 7/2010 | Jung et al. | 701/210 |
| 2011/0264654 A1* | 10/2011 | Wolosin et al. | 707/724 |

OTHER PUBLICATIONS

"GIS Functionalities Tutorial". Accessed: Apr. 8, 2010, <http://emis.jrc.ec.europa.eu/documents/Tutorial_EMIS.pdf>. pp. 1-10.

"Visualizing Infill Development Potential", Accessed: Apr. 8, 2010, <http://www.esri.com/news/arcuser/0807/infill.html>. pp. 1-11.

http://social.msdn.microsoft.com/Forums/en-US/sqlspatial/thread/f6e57f97-3c4d-4e62-965b-ab15f51ad45e, "How to Find All Points within a Polygon Drawn on a Map, If the Coordinates of the Polygon Overlap Each Other", Accessed: Apr. 8, 2010. pp. 1-9.

* cited by examiner

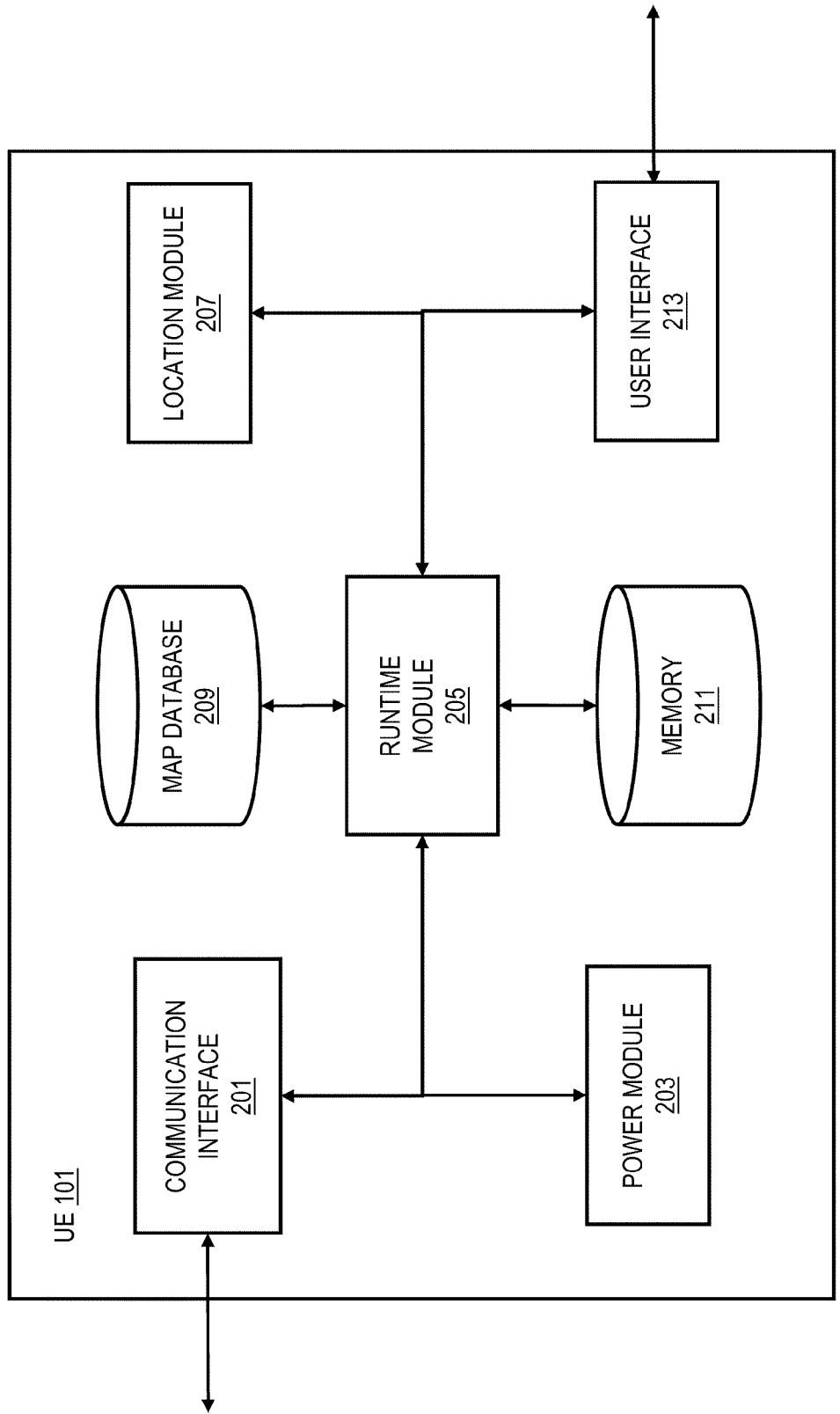

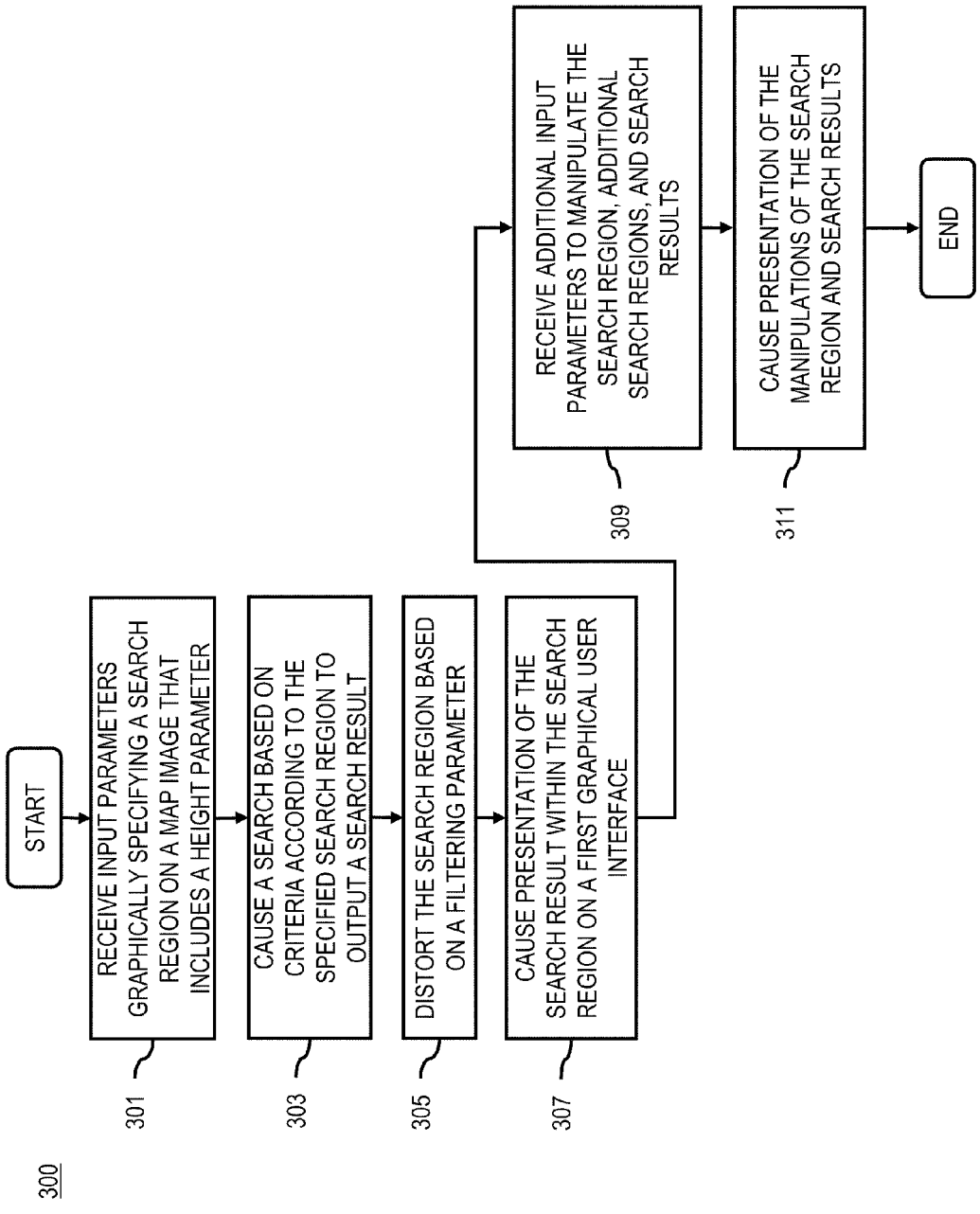

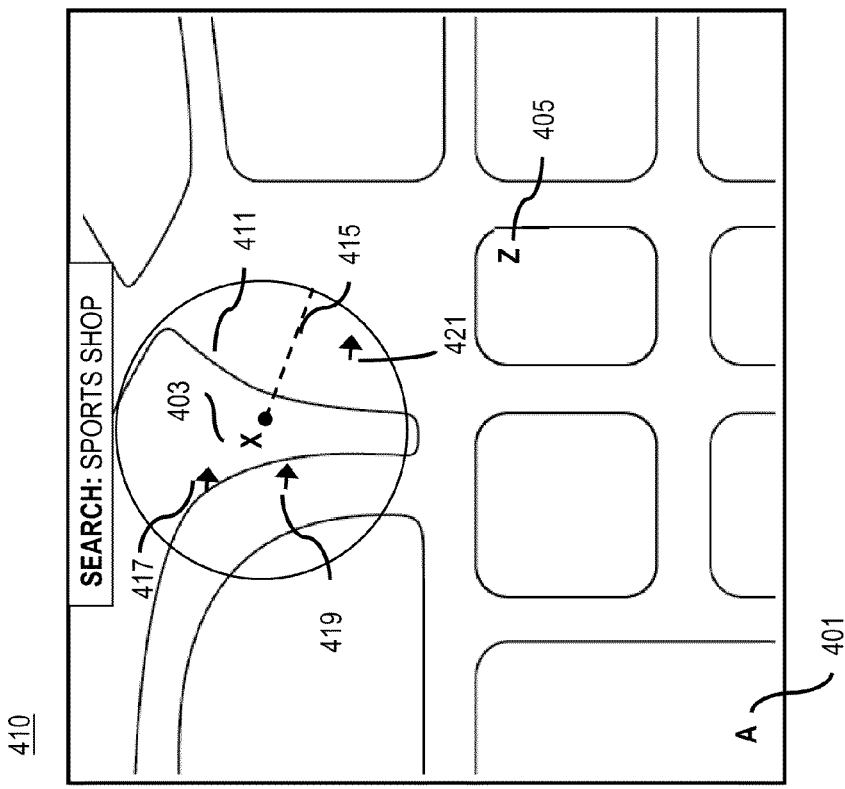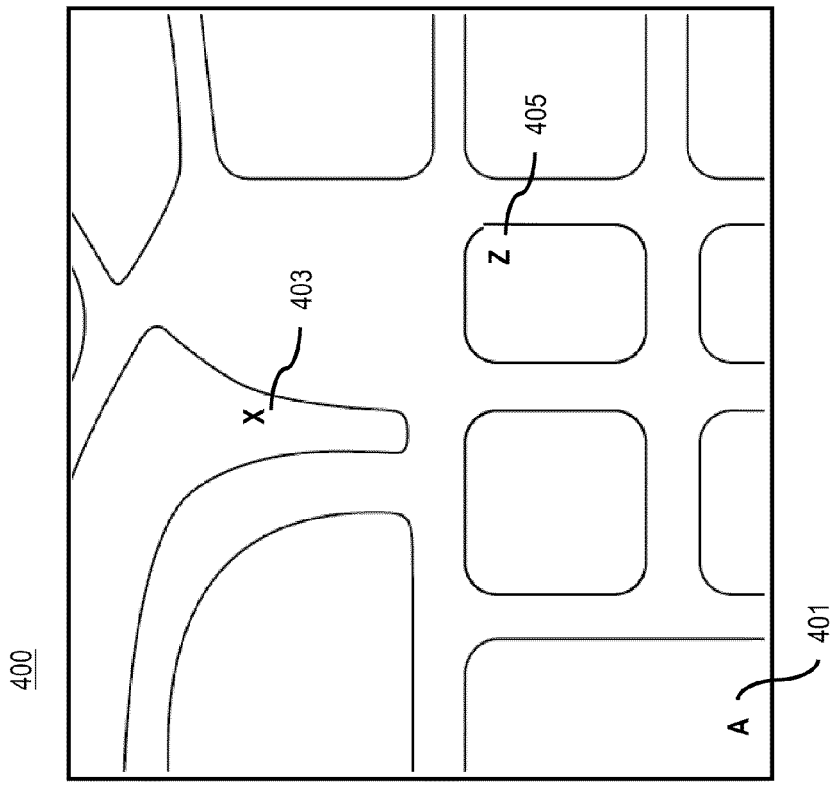

METHOD AND APPARATUS FOR SEARCHING GEO-TAGGED INFORMATION

BACKGROUND

Service providers and device manufacturers are continually challenged to deliver value and convenience to consumers by, for example, providing compelling network services, such as providing location and navigational services. For example, such services can include locating points-of-interest on a map. Unfortunately, traditional user interfaces are inadequate, or cumbersome at best, in supporting user interactivity with mapping applications. Often these user interfaces do not provide a quick, simple mechanism to perform searches for particular locations. Thus, users are deterred from using these location and navigational services.

SOME EXAMPLE EMBODIMENTS

According to one embodiment, a method comprises receiving input parameters graphically specifying a search region on an image of a map. The input parameters include a height parameter, and the search region corresponds to one or more search criteria. The method also comprises causing, at least in part, a search based on the criteria according to the specified search region to output a search result. The method further comprises causing, at least in part, presentation of the search result within the search region.

According to another embodiment, an apparatus comprising at least one processor, and at least one memory including computer program code, the at least one memory and the computer program code configured to, with the at least one processor, cause, at least in part, the apparatus to receive input parameters graphically specifying a search region on an image of a map. The input parameters include a height parameter, and the search region corresponds to one or more search criteria. The apparatus is also caused to cause, at least in part, a search based on the criteria according to the specified search region to output a search result. The apparatus is further caused to cause, at least in part, presentation of the search result within the search region.

According to another embodiment, a computer-readable storage medium carrying one or more sequences of one or more instructions which, when executed by one or more processors, cause, at least in part, an apparatus to receive input parameters graphically specifying a search region on an image of a map. The input parameters include a height parameter, and the search region corresponds to one or more search criteria. The apparatus is also caused to cause, at least in part, a search based on the criteria according to the specified search region to output a search result. The apparatus is further caused to cause, at least in part, presentation of the search result within the search region.

According to another embodiment, an apparatus comprises means for receiving input parameters graphically specifying a search region on an image of a map. The input parameters include a height parameter, and the search region corresponds to one or more search criteria. The apparatus also comprises means for causing, at least in part, a search based on the criteria according to the specified search region to output a search result. The apparatus further comprises means for causing, at least in part, presentation of the search result within the search region.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2A is a diagram of the components of a user equipment capable of causing a search based on a user provided search region, according to one embodiment;

FIG. 3 is a flowchart of processes for presenting search information based on search parameters including a specified search region, according to one embodiment;

FIGS. 4A-4I are diagrams of user interfaces utilized in the processes of FIG. 3, according to various embodiments;

DESCRIPTION OF SOME EMBODIMENTS

Examples of a method, apparatus, and computer program for causing a search of geo-tagged information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
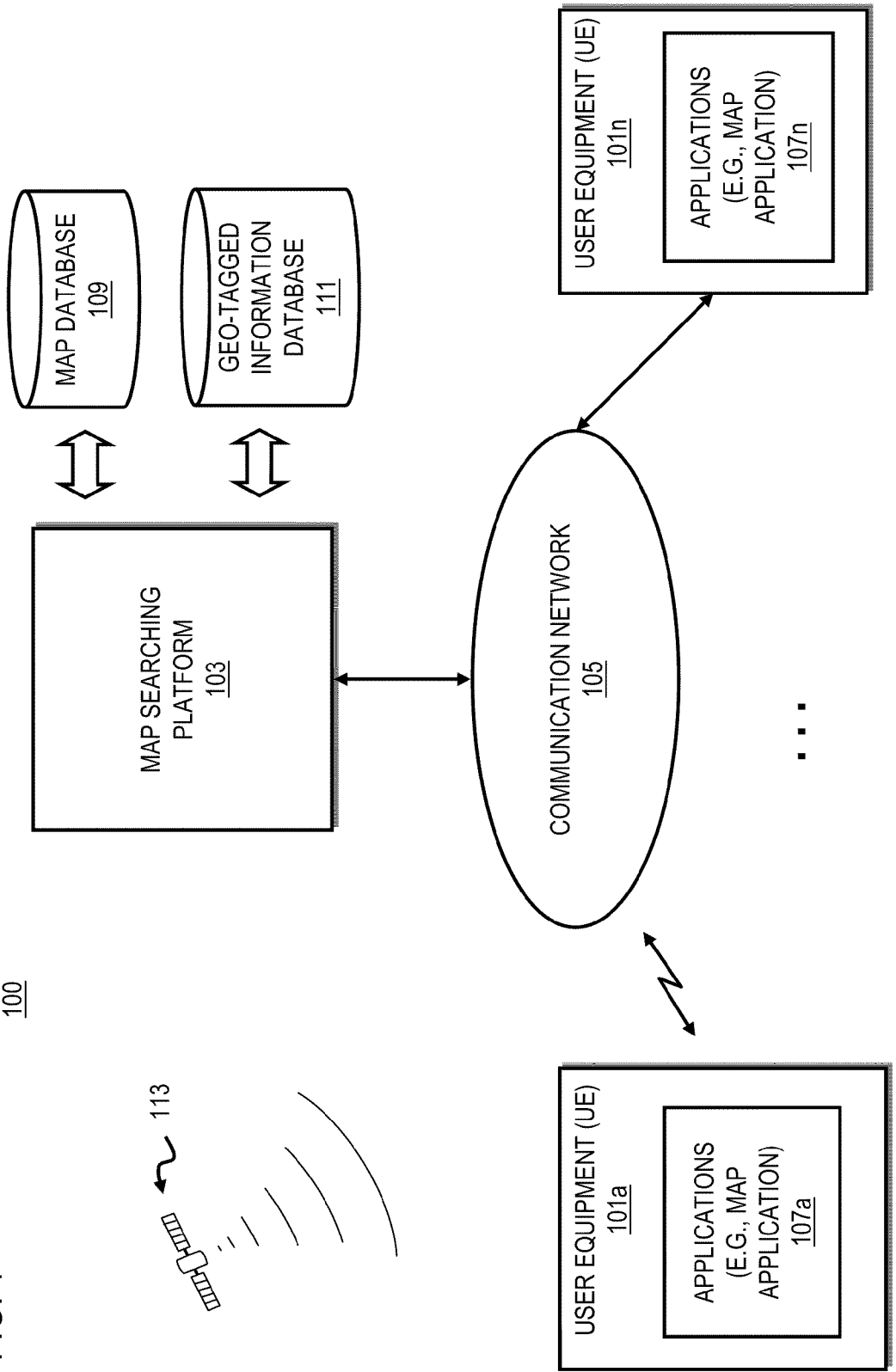
FIG. 1 is a diagram of a system including user equipment capable of causing a search based on a user provided search region, according to one embodiment.

FIG. 1 is a diagram of a system 100 including user equipment 101 capable of causing a search based on user input including a user provided search region, according to one embodiment. As mentioned, often it is useful for users of a user equipment (UE) 101*a*-101*n* to obtain information from geo-tagged information items corresponding to locations of a map. In certain embodiments, geo-tagged information items represent points-of-interest (POIs), media (e.g., video, images, audio, etc.) or other identifiable information that can be associated with locations using coordinates (e.g., longitude, latitude, altitude, etc.) or other location information. However, it may be difficult for a user to intuitively input information for the search or dynamically modifying the search region. This may occur because the user interface may not allow for an intuitive input to modify search regions of the search on a map.

To address this problem, system 100 of FIG. 1 introduces the capability to cause a search based on user input including a user provided search region. The user may be provided the option to input parameters of a search and a search region via a graphical user interface (GUI) associated with the user's UE 101. The search can then be formed into a query to a map searching platform 103 via a communication network 105 to process the search. A map application 107a-107n of the UE 101 may be used to receive the input parameters. Moreover, the map searching platform 103 may use a map database 109 and a geo-tagged information database 111 to determine search output—such as search results for the search query. The map application 107 of the UE 101 may be used to determine a current location of the UE 101 using global positioning system (GPS) satellites 113, for example. The current location of the UE 101 may be used in determining search options that can be presented to the user on the GUI. Moreover, the current location may be displayed to the user to show the relationship of the user's current location to search regions.

In one scenario, the user may be presented a GUI that allows the user to enter criteria about the geo-tagged information item that the user wishes to gather information about. The criteria can include categories (e.g., restaurant, music store, sports store, park, park photographs etc.), names (e.g., The Compact Disc Shop, Central Park, Theme Park photographs, etc.), or other keyword search terms. Moreover, the user is able to enter parameters to determine a search region. In some embodiments, a search region can be a two dimensional bounded area or a three dimensional bounded space on a map image. The map image may also be two dimensional or three dimensional. The search region may be selected by the user by specifying a center of the search region and then specifying a radius of the search region. In certain embodiments, the center can be predetermined to be the location of the UE 101, or a POI (e.g., a subway station, a bus stop, or a store).

Moreover, in a three dimensional search region, the user may specify a height to the search region. The height may be used to determine an altitude range to search. The altitude may be significant to determine whether a user needs to climb a steep hill or cliff to arrive at a search result location. The user can avoid these difficulties by setting the altitude range. For example, a height in an upwards direction on a UE 101 may be considered an altitude range from the center of the of the search region. Moreover, a height in a downwards direction on a UE 101 may be considered an depth from the center of the search region. The radius of the search region may be used to determine the size of the shape (e.g., a polygon, a circle, a square, a rectangle, a triangle, etc.) corresponding to the search region. A radius for a square or regular polygon may be determined by the distance from the center to any of the polygon's vertices. Moreover, the radius of a rectangle, triangle, or irregular polygon may correspond to the distance from the center to the closest point on the perimeter (minimum radius) or the farthest point on the perimeter (maximum radius). In certain embodiments, the input is provided via a touch screen device; and the user is able to select a center point, and then drag the user's finger to assign a radius to the region. Then, the user can lock the image by removing the user's finger form the screen. Further, the user may determine a height by once again touching and dragging the user's finger on the screen.

In certain embodiments, the system 100 includes a map searching platform 103. The map searching platform 103 may receive requests from a UE 101 to conduct a search based on parameters filled by the UE 101. The map searching platform 103 may receive a request from a UE 101 to perform a search on a map. The request can specify search parameters (e.g., a search keyword and a search region). The map searching platform 103 may then run an analysis using search parameters from the UE 101 on information from a map database 109 and/or a geo-tagged information database 111. Once the analysis is complete, the map searching platform 103 may generate a response message to send the UE 101 informing the UE 101 of the search results. In one embodiment, the request may be a request for information about geo-tagged items within a search region. The request can then be processed to determine the response message. In this embodiment, the response message may include resultant geo-tagged items and/or locations of the geo-tagged items.

In one embodiment, the system 100 includes a map database 109. The map database 109 may include location data about locations. The location data may include geographic data such as street name data, elevation data, geographic structure data (e.g., rivers, hills, mountains, oceans, etc.) as well as POI data, such as landmark data, restaurant data, store data, and the like. The map database 109 may additionally associate geographic coordinates to the map. Moreover, the map database 109 may include location coordinates of the POI data. The map database 109, a subset of the map database 109, or another map database may be stored on the UE 101. In this manner, the UE 101 need not download specific geographic map data each time the UE 101 generates a request to the map searching platform 103. Additionally, the map database 109 may include information about geographic regions of the map database 109 that can be used for filtering (e.g., a danger level, road closure information, etc.). Further, the map database 109 may include travel information (e.g., metro access points, bus stop information, etc.) about different points of interest on the map.

In another embodiment, the system 100 includes a geo-tagged information database 111. The geo-tagged information database 111 stores geo-tagged information items, which be synchronized to the map database 109 so that coordinates of each database may correspond to each other. The geo-tagged information items may include coordinates that are associated with a longitude, latitude, and/or altitude. Additionally, geo-tagged information items may include information about the name and other attributes of the geo-tagged information item (e.g., the type of geo-tagged information item (e.g., POI, media, etc.), ratings, cost of geo-tagged information items, etc.).

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), a navigation device, or any combination thereof. It is also contemplated that the UE 101 can support any type of interface to the user (such as "wearable" circuitry, etc.).

As shown in FIG. 1, the system 100 comprises UEs 101 having connectivity to a map searching platform 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

By way of example, the UE 101 and map searching platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

FIG. 2A is a diagram of the components of a user equipment capable of causing a search based on a user provided search region, according to one embodiment, according to one embodiment. By way of example, the UE 101 includes one or more components for causing a search based on a user provided search region. It is contemplated that the functions of these components may be combined in one or more components or performed by other components of equivalent functionality. In this embodiment, the UE 101 includes a communication interface 201, a power module 203, a runtime module 205, a location module 207, a map database 209, a memory 211, and a user interface 213.

In one embodiment, the UE 101 includes a communication interface 201. The communication interface 201 can be used to communicate with a map searching platform 103 or other UEs 101. Certain communications can be via methods such as an internet protocol, messaging, or any other communication method (e.g., via the communication network 105). In some examples, the UE 101 can send a query to a map searching platform 103 via the communication interface 201. The map searching platform 103 may then send a response back via the communication interface 201. Moreover, the UE 101 may communicate with other UEs 101 to synchronize and share search data (e.g., search criteria and/or search regions).

The power module 203 provides power to the UE 101. The power module 203 can include any type of power source (e.g., battery, plug-in, etc.). Additionally, the power module 203 can provide power to the components of the UE 101 including processors, memory, and transmitters.

In one embodiment, a UE 101 includes a location module 207. This location module 207 can determine a user's location. The user's location can be determined by a triangulation system such as GPS, Assisted-GPS (A-GPS), Cell of Origin, or other location extrapolation technologies. Standard GPS and A-GPS systems can use satellites to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 207 may also utilize multiple technologies to detect the location of the UE 101. Location coordinates can be determined using the location module 207. These location coordinates can be used by the runtime module 205 to display a user location on a map on a user interface 213 of the UE 101.

In certain scenarios, the UE 101 has a user interface 213. The user interface 213 can include various methods of communication. For example, the user interface 213 can have outputs including a visual component (e.g., a screen), an audio component, a physical component (e.g., vibrations), and other methods of communication. User inputs can include a touch-screen interface, a scroll-and-click interface, a button interface, a microphone, etc. Moreover, the user interface 213 may be used to display maps from the map database 209 and geo-tagged information items from the memory 211. In certain embodiments, the map database 209 includes the information or a set of the information in an external map database 109 or additional or separate map information. Further, the user interface 213 can be used to input search parameters including a keyword or other search and a search region.

Figure 2B:
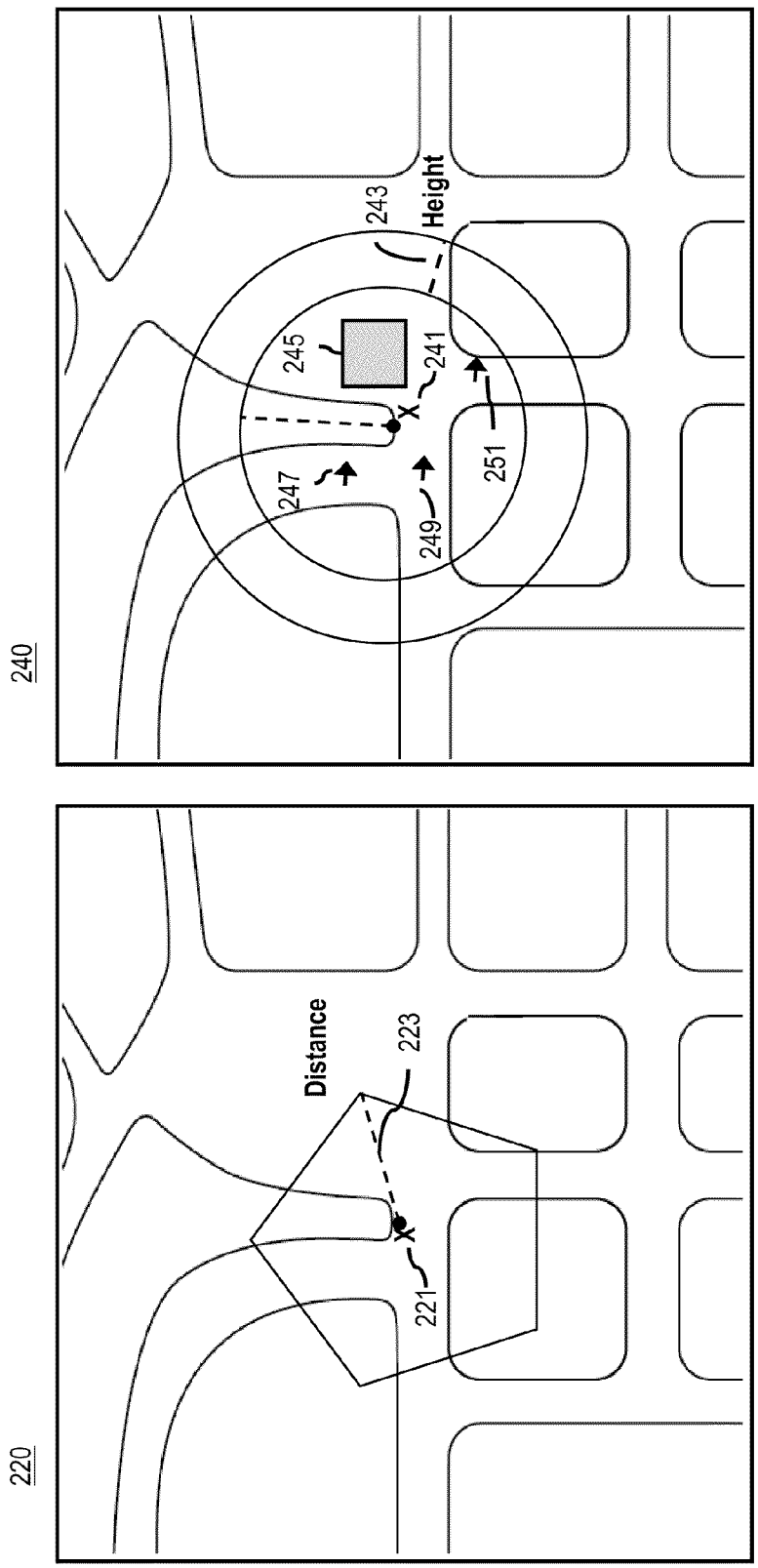
FIG. 2B is a diagram of user interfaces utilized by the user equipment, according to various embodiments.

FIG. 2B is a diagram of user interfaces 220, 240 utilized by the user equipment 101, according to various embodiments. The user may input a search term using one of the inputs of the user interface 220, 240 of the UE 101. The search term may be input as free text (e.g., via a keyboard-like interface) or selected from a predefined (e.g., hierarchical, categorical, etc.) list of search terms (e.g., higher level categories to lower level categories of POIs). The user may also be provided an opportunity to select a search region. The search region may be formed in any variety of shapes and sizes, depending on such factors as display size, cursor control capability, etc. In one embodiment, the user may select the shape from a predetermined set of shapes (e.g., a circle, a sector of a circle, a square, a rectangle, an oval, another polygon, etc.), including irregular shapes. In certain scenarios, the user is able to select a center point 221 or other starting point (not shown) for the search region and then specify a distance 223 (e.g., a radius from a center point 221 or a length from a starting point) of how far the search region covers. The selection can be made via one or more types of user input, including a touch screen interface and a pointing device (e.g., a mouse). If the shape is predetermined, the runtime module 205 may store the selected shape, center point 221, 241 information (e.g., longitude, latitude, and altitude), and the distance as parameters to be transferred to the map searching platform 103, which may then be used as the search region during a search. Moreover, the search region can be displayed to the user while the user is selecting the search region. For example, the search region shape may be a pentagram with a center point 221 and a radius distance 223.

Further, as shown in user interface 240, the user may additionally specify a height 243. The height 243 may also be used to specify the search region and transferred to the map searching platform 103. In certain embodiments, a filtered area or region 245 of the search area is filtered due to filtering rules. Filtering rides may include filtering based on the height (e.g., no objects within the selected height parameters are within the filtered region 245) based on danger (e.g., violent area), based on access (e.g., no access due to road work), or based on other filtering rules. The filtered region may be visible to the user as a distortion of the search region.

Once the search information (e.g., one or more search terms and a defined search region) is collected by the UE 101, a search can be caused by the UE 101. The search parameters may be sent to a map searching platform 103 to perform the search based on the search information. Then, the UE 101 may receive search results from the map searching platform 103. Alternatively or additionally, the UE 101 may perform the search on a local copy of a map database 209 and/or a geo-tagged information database in a memory 211 of the UE 101 to determine the search results. The search results can then be displayed on the user interface 240 using identifiers 247, 249, 251 such as icons or markers. The search region may additionally be dynamically changed to allow for additional or less search results to be displayed. This can be accomplished by changing the height or radius of the search region. The search region modification may be initiated by performing a gesture (e.g., pointing or clicking) on the search region section (e.g., the perimeter) and then selecting a type of change either from a menu or via a predetermined modification chain (e.g., 1 gesture means change radius, 2 gestures means change height, etc.).

FIG. 3 is a flowchart of a process for presenting search information based search parameters including a specified search region, according to one embodiment. In one embodiment, the runtime module 205 performs the process 300 and is implemented in, for instance, a chip set including a processor and a memory as shown FIG. 6. A user may start a map application 107 executing on the runtime module 205 of a UE 101 of the user to search for geo-tagged information. Then, the user may enter search information on a user interface 213 of the UE 101.

In step 301, the runtime module 205 is caused to receive input parameters graphically specifying a search region on an image of a map. The search region may correspond to one or more search criteria. The search criteria can include one or more search terms. The search criteria may be input using input features of the user interface 213 of the UE 101 based on free text or in a predefined architecture such as a categorical architecture. The input parameters may also be specified by using the user interface 213. The input parameters may be specified in various ways, including the processes described in FIGS. 2B and 4A-4I. Under one exemplary scenario, the search region may be a cylinder. A search circle may be specified by a touch screen interface by selecting a center point 241 and then dragging a finger (or other pointer such as a stylus) of a user to determine a radial distance of the search region. Next, the user may lift the finger and then again touch the screen and drag to determine a height 243 of the search region. The height can be determined based on an altitude of the center point 241. The altitude of the center point 241 may be used as a ceiling for the search region, a floor for the search region, or a central height for the search region.

Then, at step 303, the runtime module 205 causes, at least in part, a search based on the criteria according to the specified search area to output a search result. In one embodiment, the search is completed internal to the UE 101. In this embodiment, the UE 101 can include a map database 209 and a local geo-tagged information database. In one scenario, the local geo-tagged information database may include media captured by the UE 101, favorite POIs of the user, recently used geo-tagged information items, or the like. The search can be performed on the two databases to determine the search result. In another embodiment, the input parameters and the search criteria are caused to be transmitted to a map searching platform 103. The map searching platform performs the search on the map database 109 and/or geo-tagged information database 111 and determines a search result. The search result is then transmitted to the runtime module 205. The runtime module 205 is caused to receive the search result.

In certain optional embodiments, at step 305, the search region is distorted based on a filtering parameter. One or more filtering rules can be used to filter search regions from being selected. The filtering rules may include filters based on a user profile (e.g., a child profile, an adult profile, a tourist profile, etc.). A child profile may be set by a parent of a child user of the UE 101. The child profile may be used to filter adult regions (e.g., a red light district, a bar district, a high crime district, etc.) from the available search regions of the child user. Additionally, the adult profile may be used to filter different regions based on the taste of the user. Moreover, a tourist profile may be used to filter certain areas of the selected region that may not be adequate for a tourist (e.g., a region that does not speak foreign languages, a region with high crime, a region known for poor tourism experiences, etc.). Filtering information can be stored on a map database 109, 209 of the UE 101 and/or associated with the map searching platform 103. In certain embodiments, the filtering information may be included in the search criteria. In one example, a filtering profile may be selected by the user or be preselected (e.g., default) by the UE 101. Then, the runtime module 205 can retrieve a filtering parameter based on the filtering profile. The filtering parameter can include location coordinates of areas that should be filtered based on the filtering profile. The search region is then distorted based on the filtering parameter. This can include removing the region associated with the filtering parameter from the search region, shading of the filtered regions in the search region, or marking some other indicator of the filtered search region.

Next, at step 307, the runtime module 205 causes presentation of the search result within the search region. The search region can be displayed on a graphical user interface associated with the UE 101. The presentation can include the search region and search results 247, 249, 251 within the search region. Examples of the graphical user interface are shown in FIGS. 2B and 4A-4I.

In optional embodiments, at step 309, additional input parameters are received to manipulate the search region, additional search regions, and/or the search results. In certain embodiments, described further in the description of FIGS. 4A-4D, additional manipulations can be performed on one or more additional search regions defined by the user. In other embodiments, such as the embodiment described in FIG. 4E, more than one graphical user interface may be used to present the search region and/or search results. After receiving the manipulations, the search results can be dynamically modified based on new search results determined using an altered search region. Then, in step 311, the runtime module 205 can cause, at least in part, presentation of the manipulations of the search region(s) and the search result(s).

The above approach provides for an intuitive means to input search terms and define and dynamically modify a search region for searching geo-tagged information items. Moreover, the search region can be manipulated and shared with other user equipment. Further, describing a search region using a reference point, a radial distance, and a height allows for bandwidth consumption of a UE 101 to be more efficient when the UE 101 requests a map searching platform 103 to perform a search because the amount of data transferred is minimized.

FIGS. 4A-4I are diagrams of user interfaces utilized in the processes of FIG. 3, according to various embodiments. In one scenario, user interface 400 can be used to describe information on an image of a map presented to a user of a UE 101. In this scenario, point A 401 can be the location of a user of the UE 101. The location can be determined using a location module 207 of the UE 101. The location can then be caused to be presented to the user by a runtime module 205 of the UE 101. The type of map and properties of the map may also be selected. For example, points X 403 and Y 405 can represent endpoints of a type of transportation (e.g., public transportation such as a bus or subway, public parking lots, etc.). This information can be stored on a local map database 209 and can be turned on or off by user input parameters.

Then, the user, in user interface 410, may decide to specify a search based on a search region 411 around point X 403. The user may specify a "sports shop" as the search criteria 413 for searching geo-tagged information items associated with the search region 411. In one example, the user can select the search region by specifying a reference point at point X 403 and then specifying a radial distance 415. The reference point can be specified on a touch screen interface by touching the reference point. The radial distance 415 may be specified by dragging a pointer (e.g., a finger) from the reference point by the radial distance 415. The radial distance 415 may be locked in by the user by lifting up the pointer. The runtime module 205 can then cause a search, such as the search described in step 303 of process 300, which yields results 417, 419, 421. In this scenario, the search criteria may include "sports shop" and the search region can include the search area described by the reference point and radial distance 415. Then, the results 417, 419, 421 can be rendered and presented on the user interface 410. In this search, the results 417, 419, 421 may be POIs that may be associated with selling sports merchandise.

Next, in user interface 430, the user specifies a second search region 431 using additional or other search criteria for a second search. In certain scenarios, the second search criteria 433 includes a search for a "music shop." The runtime module 205 can also cause the second search to be performed and receive a second set of results 435, 437, 439. The first set of results 417, 419, 421 can be concurrently displayed while the second search is taking place and the second set of results 435, 437, 439 are being displayed. The second set of results 435, 437, 439 may be displayed using different identifiers than the first set of results 417, 419, 421. Moreover, user interface 440 displays a search conducted in the second search region 431 using both search criteria 441, 443. The second search can be toggled to display searches using the first search criteria, the second search criteria, or both the first and the second search criteria in the second search region 431. Thus, the second search area may also show an information item 445 associated with the first search term in the second search area. Moreover, in one example, the two search regions may be linked together and synchronized. In this example, the search radius of one of the search regions can be used to change the size of both search regions. As the radius is being changed, additional searches can be caused to occur. Then, search results for the searches can be displayed to the user. Each region may have different or the same search criteria. In certain embodiments, the first search region 411 and the second search region 431 can be synchronized to change proportionally, inversely proportionally, or on another scale. In this manner, the search region may be dynamically changed to obtain different search results. Alternatively or additionally, the search results for the searches 441, 443 may be displayed within the viewable map (not shown) and the search results within the search region may be highlighted (e.g., via a color or bold typeface). For example, additional results can be displayed in areas not included in the search regions 411, 431.

In certain embodiments, the search and the search region can be shared between more than one graphical user interfaces (GUIs) 450, 460. In certain examples a UE 101 includes more than one screen to display GUIs (e.g., a first GUI 450 and a second GUI 460). In other examples, the UE 101 can communicate with another UE 101 over a communication interface 201 (e.g., a BLUETOOTH interface, a wireless interface, etc.). The search can be performed in a search region 451 of the first GUI 450. Then, the second GUI 460 can be prepared to receive the search region 451. The second GUI 460 may have a different scale than the first GUI 450 as displayed in FIG. 4E. In certain embodiments, the search region 451 may be moved from the first GUI 450 to the second GUI 460. On a touch screen device this may occur by moving the search region to an edge of the screen of the first GUI 450. The move can be initiated by performing a gesture on the search region and then dragging the search region to the destination. The move may cause the search region 451 to be displayed on both GUIs 450, 460. Then, the second GUI 460 may be used to manipulate the search region 461 on the second GUI 460. As the search region 451, 461 is moved, search results can be dynamically displayed. This may include a new search result 463 being found and displayed on the second GUI 460. The movement can change the center point location 453, 465 of the search region 451, 461 while keeping the radial distance and/or height of the search region consistent.

Figure 4C:
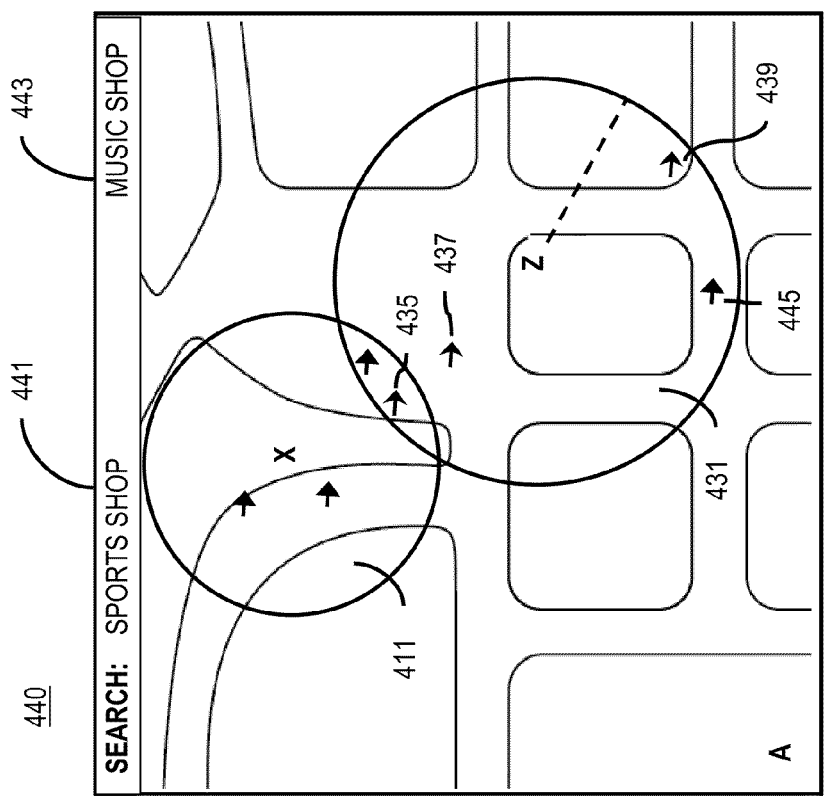
Figure 4D:
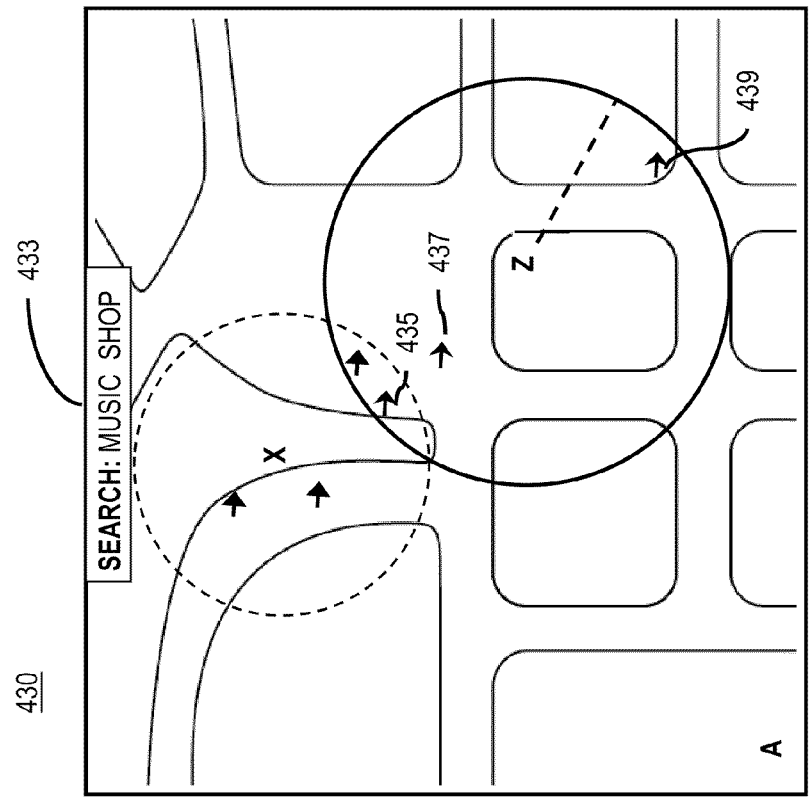
Figure 4F:
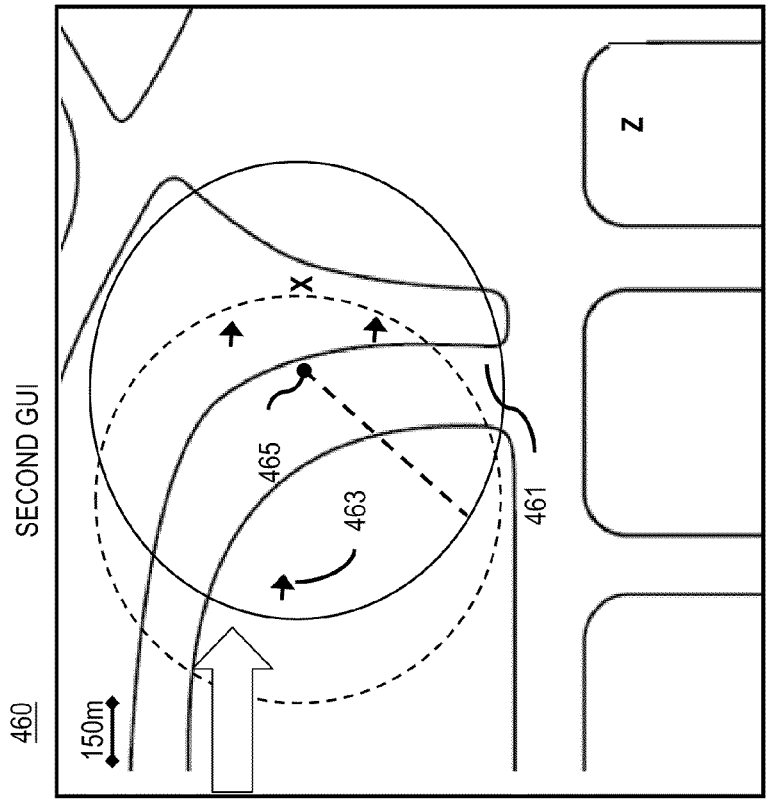
Figure 4E:
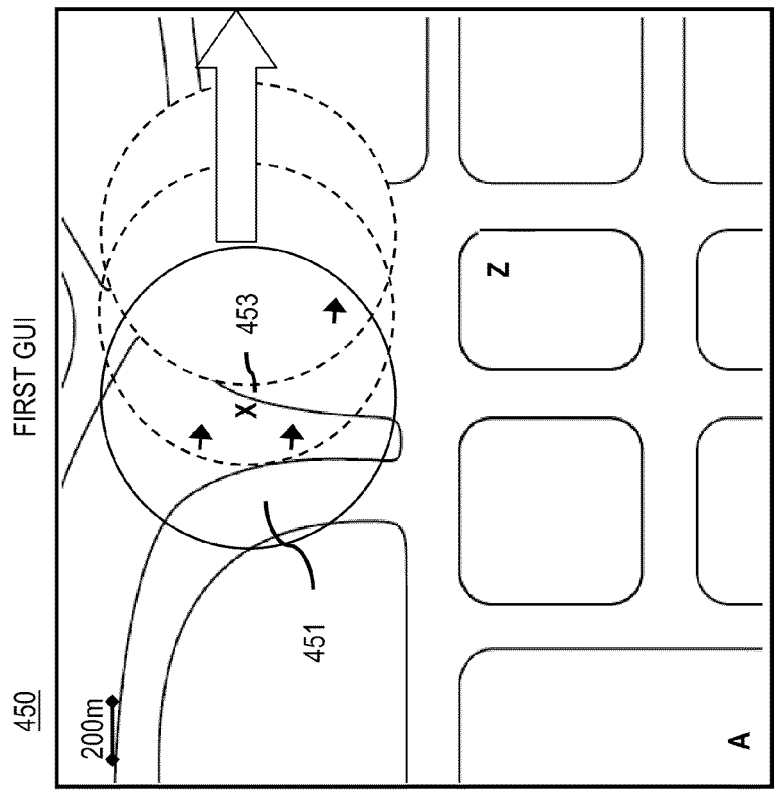

In other embodiments, the first GUI 450 and the second GUI 460 are synchronized and display the same search region 451, 461 on both GUIs 450, 460, as shown in FIGS. 4E and 4F. The two GUIs 450, 460 may be scaled to different levels allowing the user to view both a broad area and a detailed area of search results simultaneously.

Figure 4H:
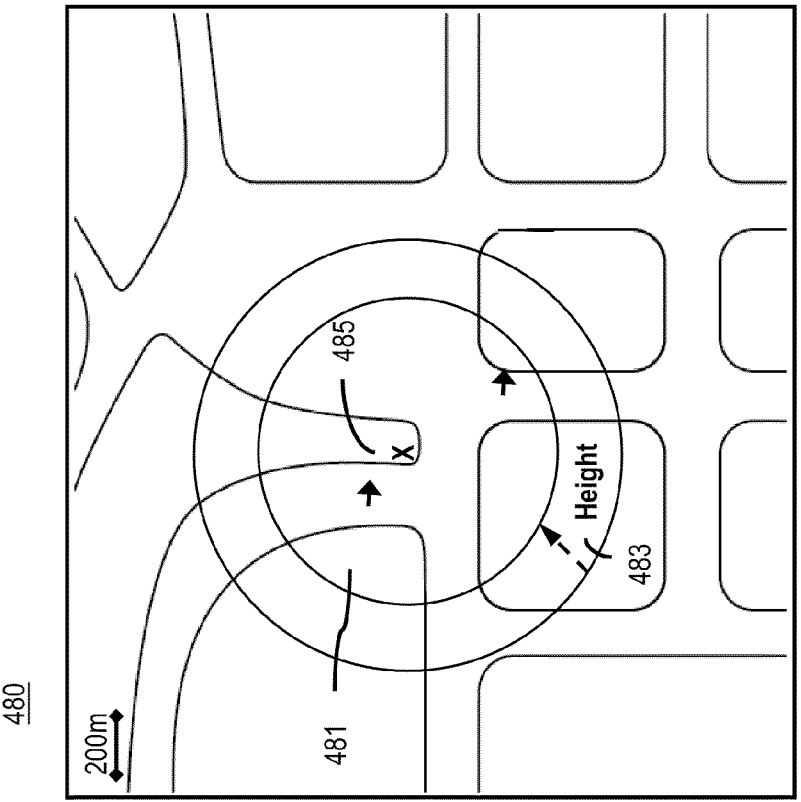
Figure 4G:
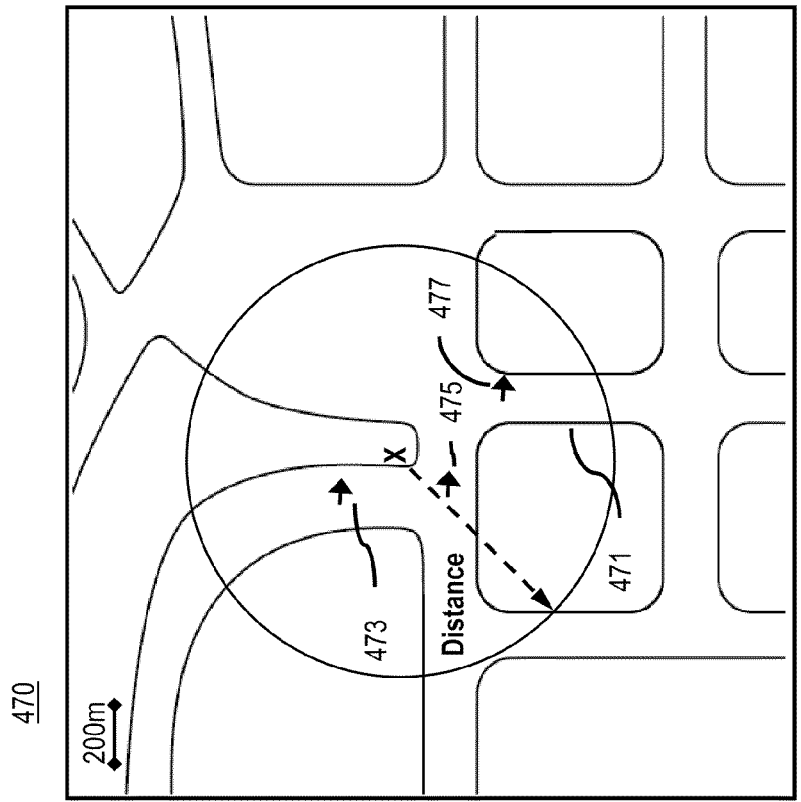

As seen in FIGS. 4G and 4H, user interfaces 470 and 480 display an approach for a user to define a search region 471, 481. The search region 471 of user interface 470 displays a two-dimensional search area that can be selected by the user by specifying a center point and a radial distance. A search can be performed to reveal that search results 473, 475, 477 are found within the search area. Then, in user interface 480, the user may add a height parameter 483. The height parameter 483 may be used to determine a three-dimensional search region 481. The three-dimensional search region 481 may utilize an altitude parameter of the selected center point 485 as a basis for determine how the height parameter affects the search region 481. In certain embodiments, the altitude parameter is stored and associated with the map database 109, 209. Additionally, altitude parameters can be stored with the geo-tagged information items and thus be used for conducting searches in the search region 481. In some examples, the altitude is a floor, a ceiling, or a middle point associated with the search region height range. In one embodiment, the user can specify a height where the altitude is a floor by specifying the height as towards (shown) the center point 485. In other embodiments, the altitude may be a ceiling by specifying the height parameter 483 as away from (not shown) the center point 485. Further, the altitude can be selected as a middle point by specifying both a parameter towards and away from the center point 485. Moreover, the altitude of the search region may be dynamically raised by the user by selecting the search region 481 into an altitude selection mode and dragging it. This information can be useful for a user because the user may want to specify that the user does not wish to travel down or up a hill. Further, because the user may not want to travel up or down a hill, the altitude range associated with the height may be calculated based on the user's current altitude (determined by the location module 207) instead of the center of the search region. Additionally or alternatively, the height may be based on a designated POI (e.g., a subway stop) or another location designated by the user. This may also eliminate the need to travel long distances to get around a cliff. Moreover, this may be useful to find geo-tagged information items that have a certain view (e.g., a restaurant POI or media information item that is a certain level above sea level may have a better view than a restaurant POI or media information item that is at ground level).

Figure 4I:
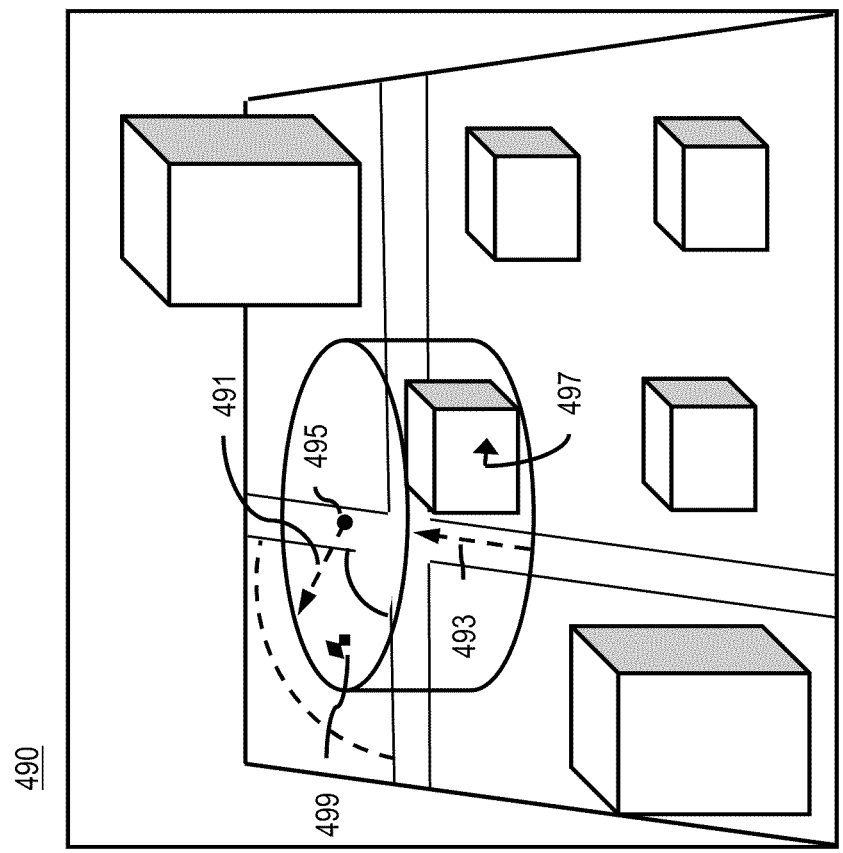

FIG. 4I displays a user interface 490 in a three-dimensional perspective view on a map. As shown in the user interface 490, radius 491 and height 493 may be specified on a three-dimensional map based on a selected reference point 495. In this manner, the user is provided the ability to view the three-dimensional search region in a perspective view of a map. The altitude may be above a ground level of the reference point 495, as set by the user via the height 493 in an upwards motion. Moreover, in this view, a search (e.g., for a sports shop) may occur in the search region. Search result 497 and POI 499 are both sports shops within the two-dimensional area of the search region. Also, search result 497 is found in the search region because the search result 497 is within the selected altitude range. POI 499, however, is located on a region of land that is below the altitude range due to a hill and is therefore not found in the search. Additionally, the three-dimensional search region on the map may be rotated for a user-definable point-of-view. As such, the user is able to select a perspective that the user would like to view the map, search region, and results in.

The processes described herein for causing a search based on a user provided search region may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
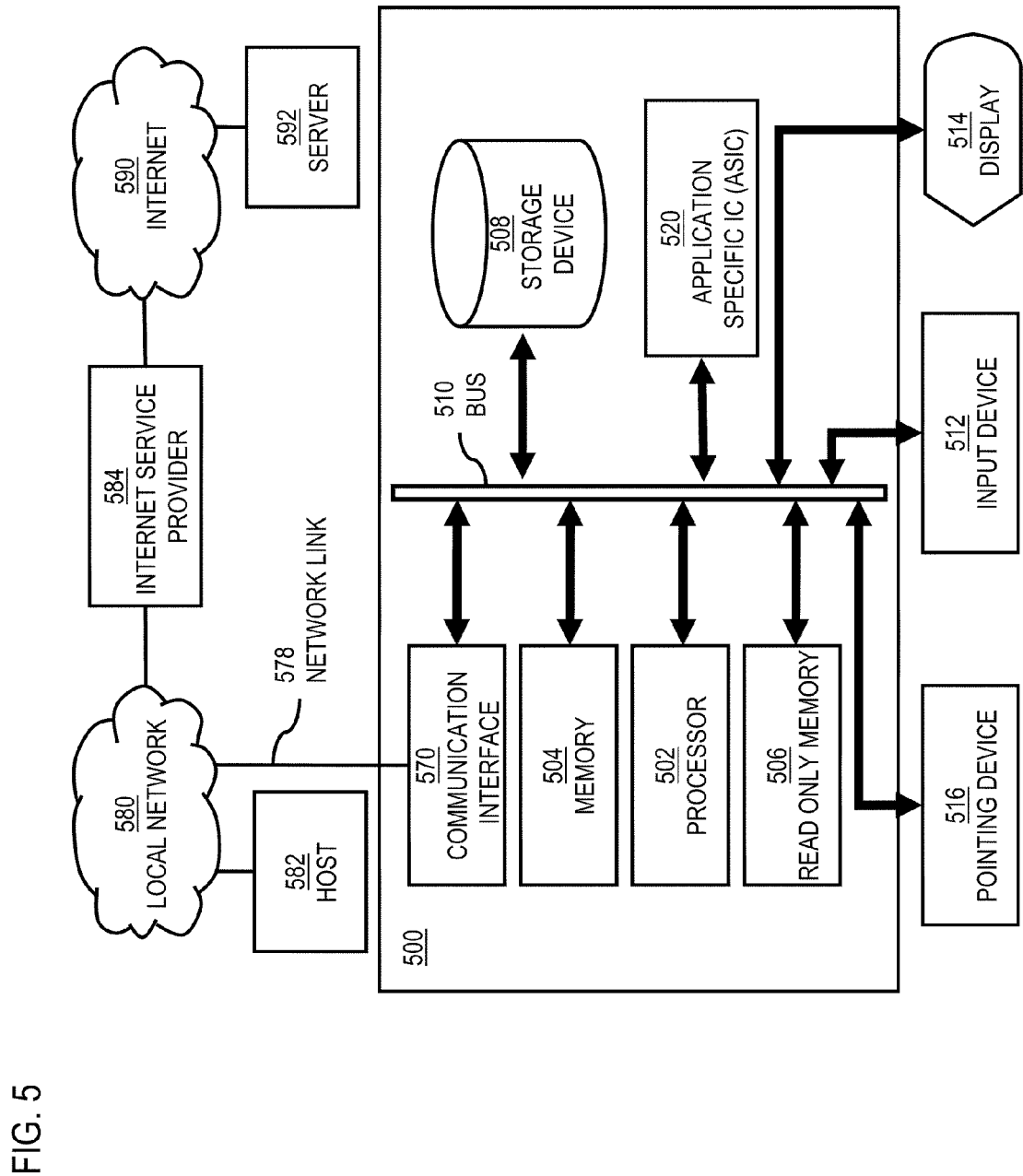
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to cause a search based on a user provided search region as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of causing a search based on a user provided search region.

A bus 510 includes one or more parallel conductors of information so that information is transferred quickly among devices coupled to the bus 510. One or more processors 502 for processing information are coupled with the bus 510.

A processor 502 performs a set of operations on information as specified by computer program code related to causing a search based on a user provided search region. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or other dynamic storage device, stores information including processor instructions for causing a search based on a user provided search region. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for causing a search based on a user provided search region, is provided to the bus 510 for use by the processor from an external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT) or a liquid crystal display (LCD), or plasma screen or printer for presenting text or images, and a pointing device 516, such as a mouse or a trackball or cursor direction keys, or motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to from the communication network 105 to the UE 101.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

Figure 6:
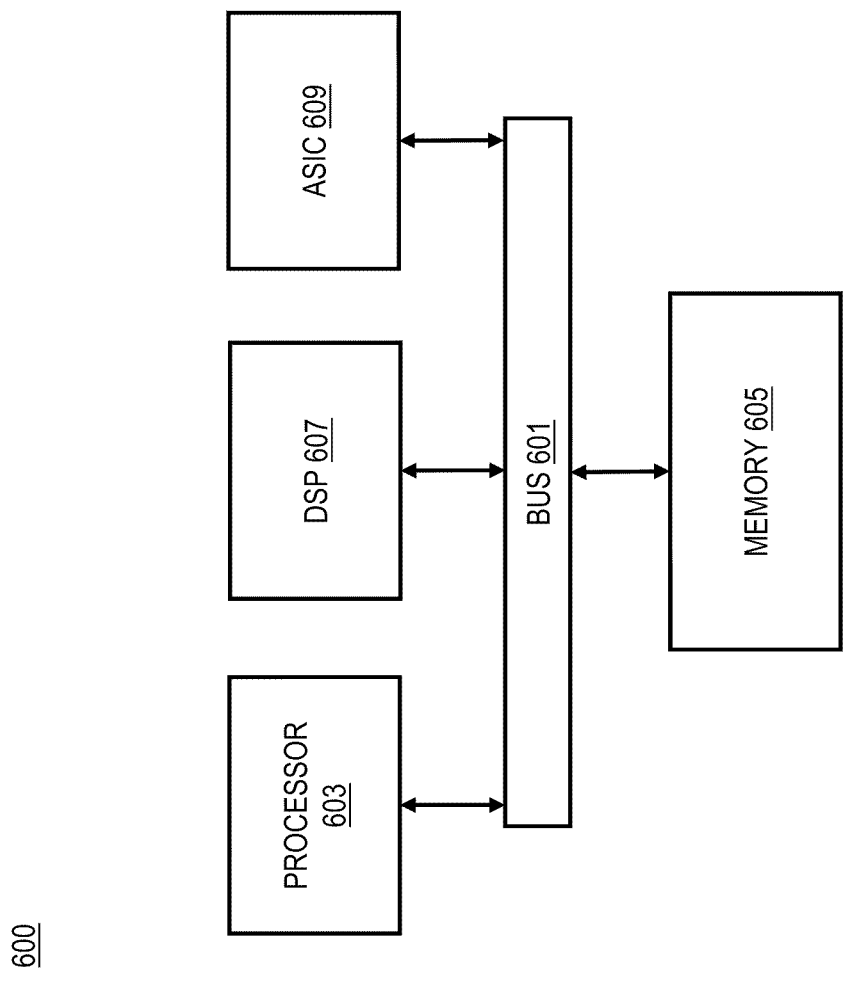
FIG. 6 is a diagram of a chip set that can be used to implement an embodiment of the invention.

FIG. 6 illustrates a chip set 600 upon which an embodiment of the invention may be implemented. Chip set 600 is programmed to cause a search based on a user provided search region as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of causing a search based on a user provided search region.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor.

Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to cause a search based on a user provided search region. The memory 605 also stores the data associated with or generated by the execution of the inventive steps.

Figure 7:
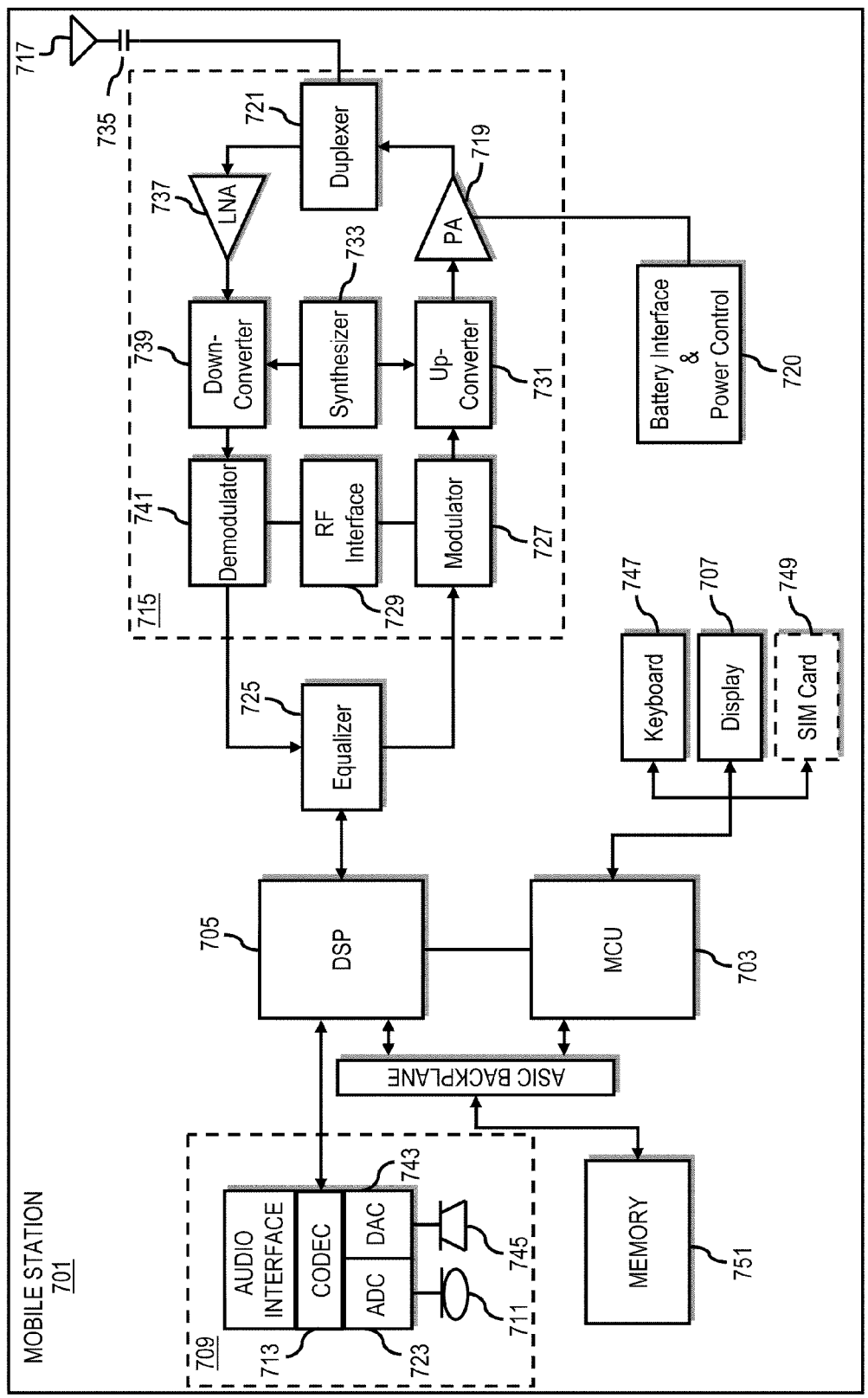
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 700, or a portion thereof, constitutes a means for performing one or more steps of causing a search based on a user provided search region. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of causing a search based on a user provided search region. The display 7 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703—which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to cause a search based on a user provided search region. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving input parameters graphically specifying a search region on an image of a map, wherein the input parameters include a height parameter, and the search region corresponds to one or more search criteria;
   obtaining one or more filtering parameters based at least in part on a user profile, and filtering, by a processor, the search region based at least in part on the filtering parameters;
   causing, at least in part, by the processor, a search based on the search criteria according to the filtered search region to obtain a search result; and
   causing, at least in part, presentation of the search result within the search region,
   wherein the presentation of the search result within the search region on the image of the map is on a first graphical user interface, and
   wherein a filtered search result is visible to the user within the search region as a distortion, the method further comprising:
   causing, at least in part, presentation of the search result within the search region on another image of the map with a different scale on a second graphical user interface, and
   wherein the first graphical user interface and the second graphical user interface display the search result within the search region on images of the map with different scales simultaneously.

2. The method of claim 1, further comprising:
causing, at least in part, moving the search region from the first graphical user interface to the second graphical user interface.

3. The method of claim 1, further comprising:
receiving additional input parameters graphically specifying another search region on the map image, wherein the other search region corresponds to one or more other search criteria, and at least a portion of the other search region overlaps with the search region;
causing, at least in part, a search based on the other criteria according to the specified other search region to output another search result; and
causing, at least in part, presentation of the other search result within the other search region.

4. The method of claim 1, wherein the search region includes a circle, a polygon, a rectangle, a square, or a combination thereof.

5. The method of claim 4, wherein the input parameters further include a center of the search region and a radius length from the center to a perimeter of the search region.

6. An apparatus comprising:
at least one processor; and
at least one memory including computer program code,
the at least one memory and the computer program code configured to, with the at least one processor, cause the apparatus to perform at least the following,
receive input parameters graphically specifying a search region on an image of a map, wherein the input parameters include a height parameter, and the search region corresponds to one or more search criteria;
obtain one or more filtering parameters based at least in part on a user profile, and filter the search region based at least in part on the filtering parameters;
cause, at least in part, a search based on the search criteria according to the filtered search region to obtain a search result; and
cause, at least in part, presentation of the search result within the search region,
wherein the presentation of the search result within the search region on the image of the map is on a first graphical user interface, and
wherein a filtered search result is visible to the user within the search region as a distortion, the method further comprising:
causing, at least in part, presentation of the search result within the search region on another image of the map with a different scale on a second graphical user interface, and
wherein the first graphical user interface and the second graphical user interface display the search result within the search region on images of the map with different scales simultaneously.

7. The apparatus of claim 6, wherein the apparatus is further caused, at least in part, to:
cause, at least in part, moving the search region from the first graphical user interface to the second graphical user interface.

8. The apparatus of claim 6, wherein the apparatus is further caused, at least in part, to:
receive additional input parameters graphically specifying another search region on the map image, wherein the other search region corresponds to one or more other search criteria, and at least a portion of the other search region overlaps with the search region;
cause, at least in part, a search based on the other criteria according to the specified other search region to output another search result; and
cause, at least in part, presentation of the other search result within the other search region.

9. The apparatus of claim 6, wherein the search region includes a circle, a polygon, a rectangle, a square, or a combination thereof.

10. The apparatus of claim 9, wherein the input parameters further include a center of the search region and a radius length from the center to a perimeter of the search region.

11. A non-transitory computer-readable storage medium carrying one or more sequences of one or more instructions which, when executed by one or more processors, cause an apparatus to at least perform the following steps:
receiving input parameters graphically specifying a search region on an image of a map, wherein the input parameters include a height parameter, and the search region corresponds to one or more search criteria;
obtaining one or more filtering parameters based at least in part on a user profile, and filtering the search region based at least in part on the filtering parameters;
causing, at least in part, a search based on the search criteria according to the filtered search region to obtain a search result; and
causing, at least in part, presentation of the search result within the search region,
wherein the presentation of the search result within the search region on the image of the map is on a first graphical user interface, and
wherein a filtered search result is visible to the user within the search region as a distortion, the method further comprising:
causing, at least in part, presentation of the search result within the search region on another image of the map with a different scale on a second graphical user interface, and
wherein the first graphical user interface and the second graphical user interface display the search result within the search region on images of the map with different scales simultaneously.

12. The non-transitory computer-readable storage medium of claim 11, wherein the apparatus is further caused, at least in part, to perform:
causing, at least in part, moving the search region from the first graphical user interface to the second graphical user interface.

13. The non-transitory computer-readable storage medium of claim 11, wherein the apparatus is further caused, at least in part, to perform:
receiving additional input parameters graphically specifying another search region on the map image, wherein the other search region corresponds to one or more other search criteria, and at least a portion of the other search region overlaps with the search region;
causing, at least in part, a search based on the other criteria according to the specified other search region to output another search result; and
causing, at least in part, presentation of the other search result within the other search region.

14. The non-transitory computer-readable storage medium of claim 11, wherein the search region includes a circle, a polygon, a rectangle, a square, or a combination thereof.

* * * * *